US012525745B2

(12) United States Patent
Koch

(10) Patent No.: US 12,525,745 B2
(45) Date of Patent: Jan. 13, 2026

(54) CONNECTOR ASSEMBLY

(71) Applicant: Neutrik AG, Schaan (LI)

(72) Inventor: Matthias Koch, Götzis (AT)

(73) Assignee: Neutrik AG, Schaan (LI)

( * ) Notice: Subject to any disclaimer, the term of this patent is extended or adjusted under 35 U.S.C. 154(b) by 348 days.

(21) Appl. No.: 18/111,027

(22) Filed: Feb. 17, 2023

(65) Prior Publication Data

US 2023/0268691 A1 Aug. 24, 2023

(30) Foreign Application Priority Data

Feb. 22, 2022 (AT) .............................. A 50119/2022

(51) Int. Cl.
*H01R 13/64* (2006.01)
*H01R 13/631* (2006.01)
*H01R 13/633* (2006.01)

(52) U.S. Cl.
CPC ........... *H01R 13/64* (2013.01); *H01R 13/631* (2013.01); *H01R 13/633* (2013.01)

(58) Field of Classification Search
CPC .... H01R 13/64; H01R 13/631; H01R 13/633; H01R 24/86; H01R 13/506; H01R 13/52; H01R 13/502; H01R 13/639
See application file for complete search history.

(56) References Cited

U.S. PATENT DOCUMENTS 11,387,600 B2 * 7/2022 Dobler ............... H01R 13/6272
11,569,622 B2 * 1/2023 Dobler ............... H01R 13/6272
11,881,662 B2 * 1/2024 Dobler ................... H01R 24/50
2023/0268691 A1 * 8/2023 Koch ..................... H01R 13/64
439/345

FOREIGN PATENT DOCUMENTS

CN 207009744 2/2018
CN 207542496 6/2018
DE 102006001630 7/2007
DE 202018103136 U1 * 7/2018 ......... H01R 13/7033
EP 3819999 5/2021
EP 3905447 11/2021

* cited by examiner

*Primary Examiner* — Abdullah A Riyami
*Assistant Examiner* — Nader J Alhawamdeh
(74) *Attorney, Agent, or Firm* — Volpe Koenig

(57) ABSTRACT

A connector assembly for electrical connectors, including a housing (1) with electrical contacts (5) located therein and an insertion opening (3) for a complementary connector. The insertion opening is bounded on the insertion side primarily by an edge section (7) or a ridge rising above the insertion-side end face, and has a circumferentially bounded recess (8) in the region of the outer edge of the insertion opening. The recess includes an intermediate space between two mutually facing sections (7*a*) of the edge or ridge. A limiting element (10, 15) at least partially limits the intermediate space of the edge or ridge in the region of the circumferentially limited recess in the region of the outer edge of the insertion opening and bridges it as its continuation. On its side facing the insertion opening the limiting element forms a partial region of the boundary of the insertion opening.

9 Claims, 4 Drawing Sheets

CONNECTOR ASSEMBLY

CROSS-REFERENCE TO RELATED APPLICATIONS

This application claims priority from Austrian Patent Application No. A 50119/2022, filed Feb. 22, 2022, which is incorporated herein by reference as if fully set forth.

TECHNICAL FIELD

The invention relates to a connector assembly for electrical connectors, comprising a housing with electrical contacts located therein and an insertion opening for a complementary connector.

BACKGROUND

Such connectors are in use in the form of cable connectors and chassis sockets or panel connectors. There are also these designs for various systems for data, energy and also combined transmissions, for example XLR or RJ45 connectors.

As disclosed in EP 3 905 447 A1, for example, the insertion opening is typically limited for the most part by an edge on the insertion side. Housing designs are also known in which a mounting flange extends radially from the housing. In this case, the insertion opening is bounded on the insertion side by a ridge rising above the insertion-side end face of the housing or flange. This edge or ridge often has a circumferentially limited recess which also includes an intermediate space between two facing sections or end faces of the edge or ridge.

Built-in connector sockets in particular are typically equipped with a locking mechanism for the inserted complementary connector in order to prevent its unintentional removal and thus disconnection of the connector. This mechanism, which is accommodated in a recess at the edge of the housing and of any central contact carrier, has, as disclosed for example in EP 3 819 999 A1, an unlocking element that can be actuated from the front for the intended unlocking of the connection. This is guided through recesses in the housing and is typically provided with an actuating tab.

SUMMARY

It was the object of the present invention to provide an improved connector assembly, with better protection against contamination and improved fixation of the inserted complementary connector.

This object is solved by a device having one or more of the features described herein.

The device according to the invention is characterized in that a limiting element bridges the intermediate space of the edge or ridge in the area of the circumferentially limited recess in the area of the outer edge of the insertion opening at least partially, preferably completely, as its continuation and forms a partial area of the limitation of the insertion opening on its side facing the insertion opening. Thus, an improvement in transverse load forces can be achieved when the complementary connector is located in the insertion opening. The inserted limiting element can further serve as a lock to prevent the accidental insertion of an incorrect connector (which has a lug at the top of the insertion-side end for correct positioning). Finally, the cross-section for the penetration of dust and/or moisture is also reduced, especially when the complementary connector is inserted.

According to a first embodiment according to the invention, a locking assembly for the inserted complementary connector is accommodated in the recess. The limiting element is preferably a part of this locking assembly.

It is preferred if the locking assembly comprises an unlocking element extending or rising beyond the insertion-side end face, the side of which facing the insertion opening forms a partial area of the boundary of the insertion opening and thus constitutes the limiting element.

Preferably, the unlocking element has a first section extending coaxially to the insertion opening, preferably displaceable in its longitudinal direction, as well as a second section at the insertion-side end, which is bent up radially from the axis of the first section in the direction facing away from the insertion opening.

An alternative embodiment of the assembly according to the invention, on the other hand, is characterized in that the limiting element is designed as a slide-in part that can be inserted into the recess.

Preferably, it is provided in such an assembly that a first locking structure is formed on a side of the limiting element facing away from the insertion opening or on its housing-side end, and wherein a complementary second locking structure is formed on the inside of the recess and cooperates with the first locking structure to fix the limiting element in the housing.

Advantageously, the limiting element is designed as a flat part curved according to the course of the edge or ridge.

Preferred is an embodiment of the limiting element in which a housing-side section of the limiting element has a smaller width in the circumferential direction than an insertion-side section of the limiting element, which at most has at least one dimension corresponding to the height of the ridge around the insertion opening.

Preferably, the recess in the housing is designed to accommodate a conventional locking assembly. The limiting element is advantageously designed to match this in its housing-side section.

BRIEF DESCRIPTION OF THE DRAWINGS

For a better understanding of the invention, it is explained in more detail with reference to the following figures.

The drawings show in each case in highly simplified, schematic representation.

DETAILED DESCRIPTION

By way of introduction, it should be noted that in the differently described embodiments, the same parts are provided with the same reference signs or the same component designations, wherein the disclosures contained in the entire description can be transferred mutatis mutandis to the same parts with the same reference signs or the same component designations. Also, the positional indications selected in the description, such as top, bottom, side, etc., are related to the directly described as well as depicted figure and, in the event of a change of position, these positional indications are to be transferred mutatis mutandis to the new position.

Figure 1:
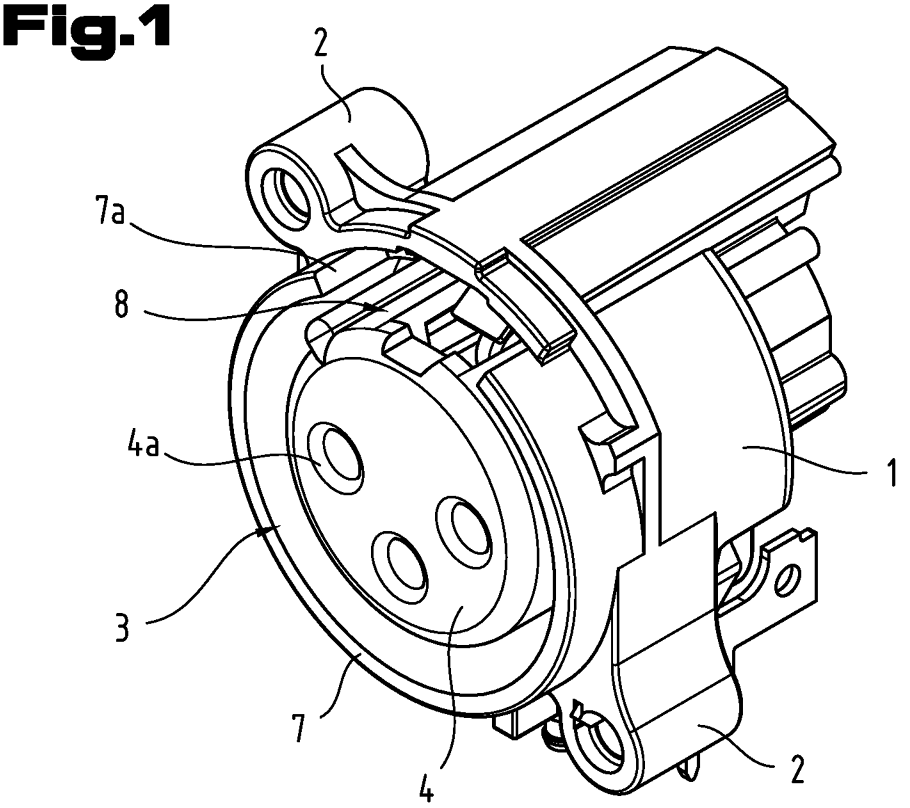
FIG. 1 shows a perspective view of a housing of an exemplary embodiment of a connector assembly according to the invention.

FIG. 1 shows an example of a connector assembly according to the invention, in the form of an XLR female panel connector, for establishing an electrical plug connection with a complementary connector, in particular a cable connector. The housing 1 of the connector assembly can be attached to a corresponding housing of an electrical device or the like by means of mounting tabs 2 in a manner known per se, for example by screwing on. An insertion opening 3 for a complementary cable connector is recessed in the housing 1 and a contact carrier 4 is inserted or formed integrally with the housing 1. The contacts 5 fixed in the contact carrier 4 are accessible through the insertion-side openings 4*a* for the contact elements of the complementary connector and project out on the rear side of the housing 1.

Figure 4:
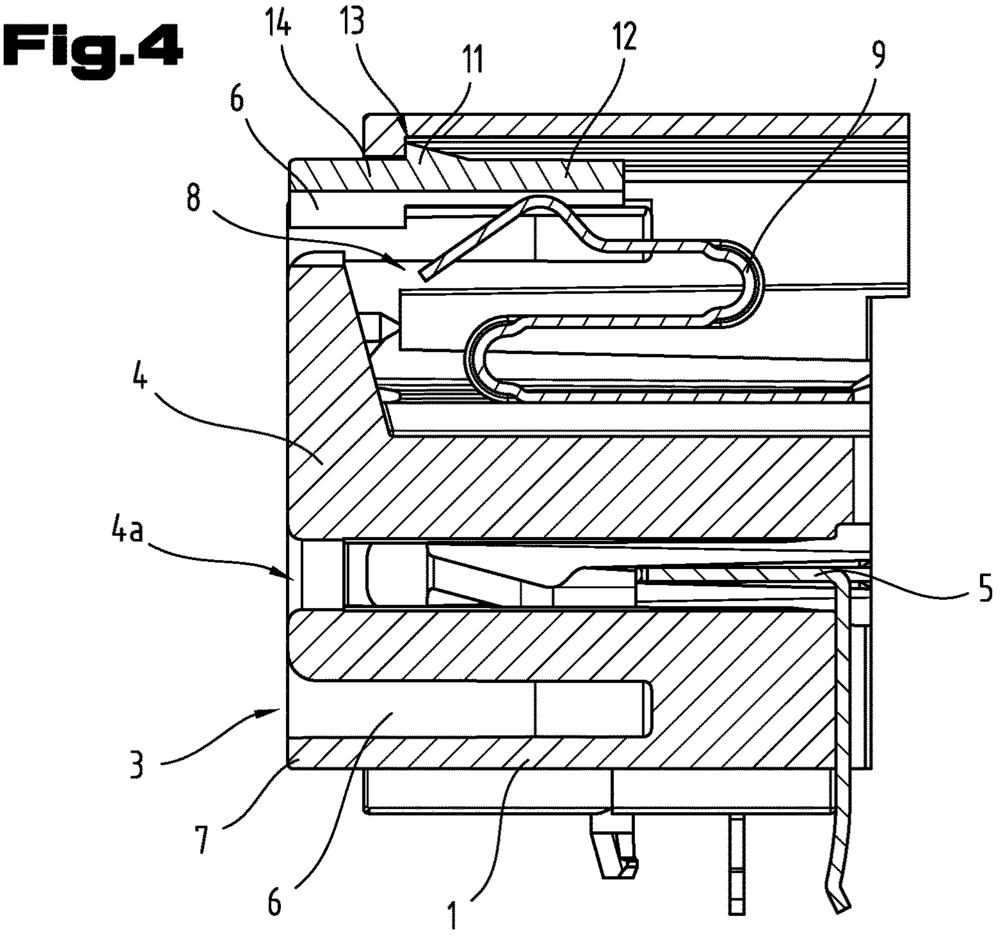
FIG. 4 shows a vertical central longitudinal section through the connector assembly of FIG. 2.
Figure 5:
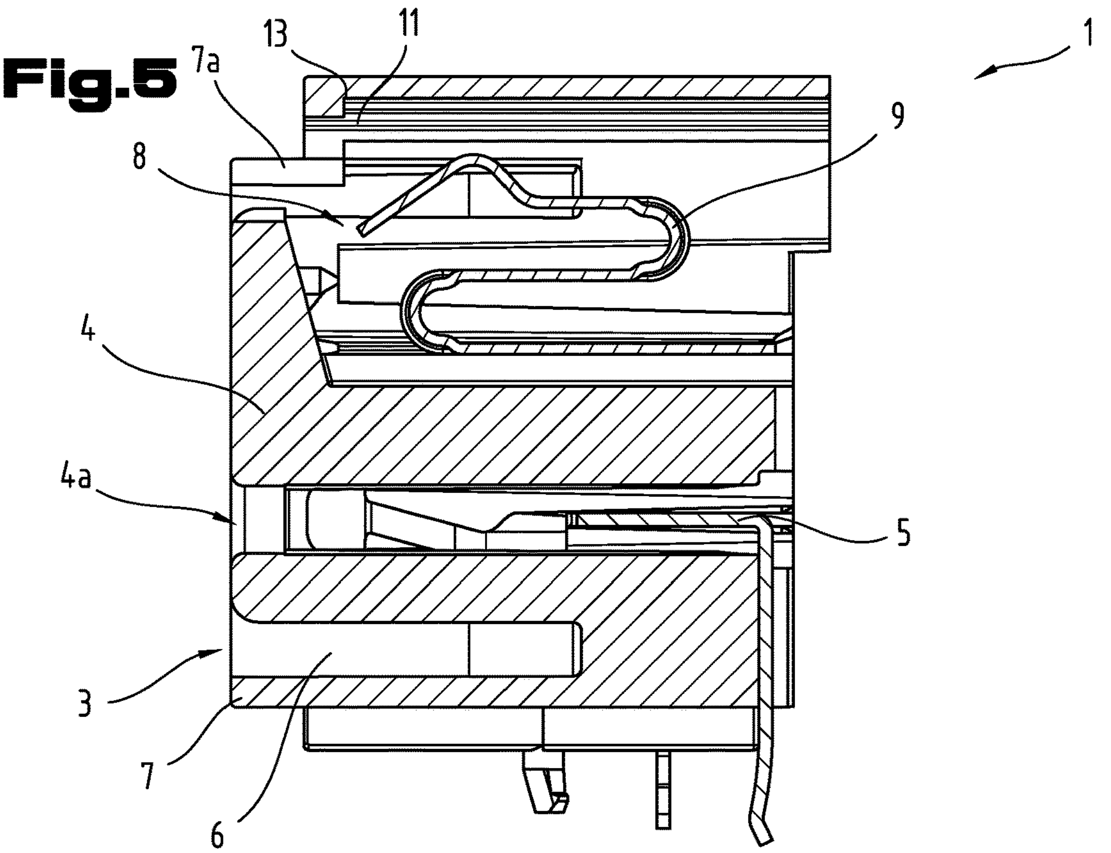
FIG. 5 shows a vertical central longitudinal section through the housing of FIG. 1.

The housing 1 is constructed from two concentrically arranged housing parts, with the contact carrier 4 as the inner housing part. The outer housing part and the contact carrier 4 are spaced apart by an annular gap 6 (see FIG. 4 and FIG. 5), which can accommodate a female plug extension of the complementary connector. Outwardly and forwardly, the insertion opening 3 is bounded by an edge 7 extending along the periphery at the outer boundary of the insertion opening 3. In the case of an embodiment of the housing 1 with a radially projecting mounting flange with an insertion-side end face, the insertion opening 3 is outwardly bounded by a ridge rising above the end face.

At at least one point in the outer region of the insertion opening 3 or, if a contact carrier 4 is present, in its outer circumferential region, a circumferentially limited recess 8 is arranged, in which additional assemblies responsible for certain functions can be accommodated. For example, a spring element 9 can be clamped in the recess 8, which performs a latching function for the complementary connector with a radially outwardly pointing bulge projecting into the annular gap 6. Instead of the spring element 9 shown, other elastic elements or assemblies, for example deflectable tongues or tabs made in one piece with the housing 1, can also be used. Associated with the recess 8 is also an interruption in the edge 7 or ridge bounding the insertion opening 3 between two facing end sections 7*a* of this edge 7 or ridge.

Figure 2:
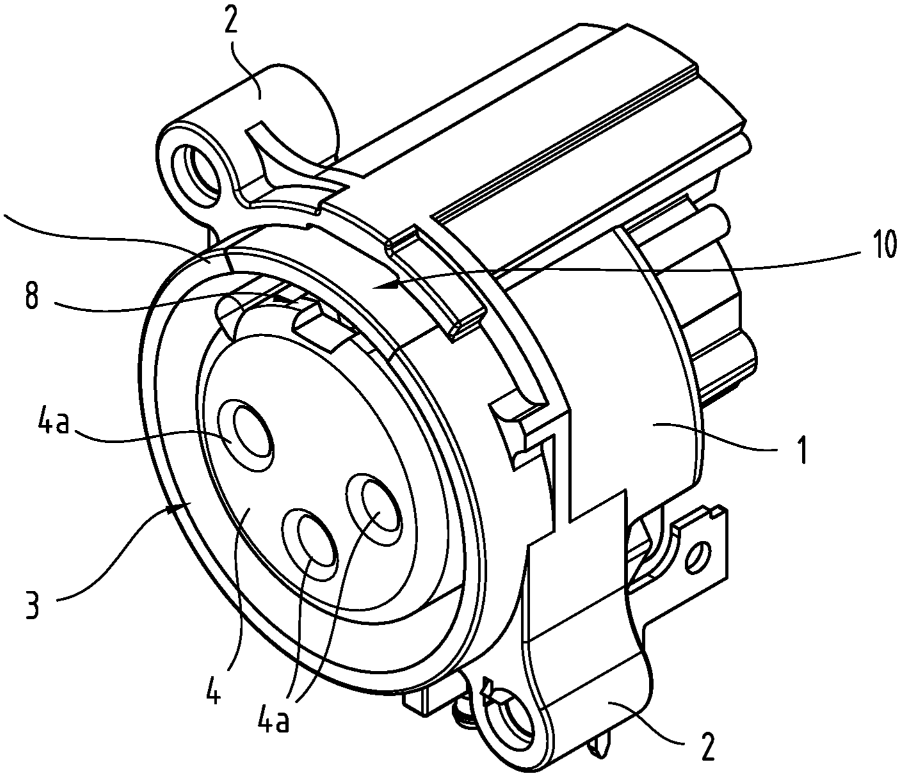
FIG. 2 shows a view corresponding to FIG. 1 of a complete connector assembly according to the invention with the housing of FIG. 1.
Figure 3:
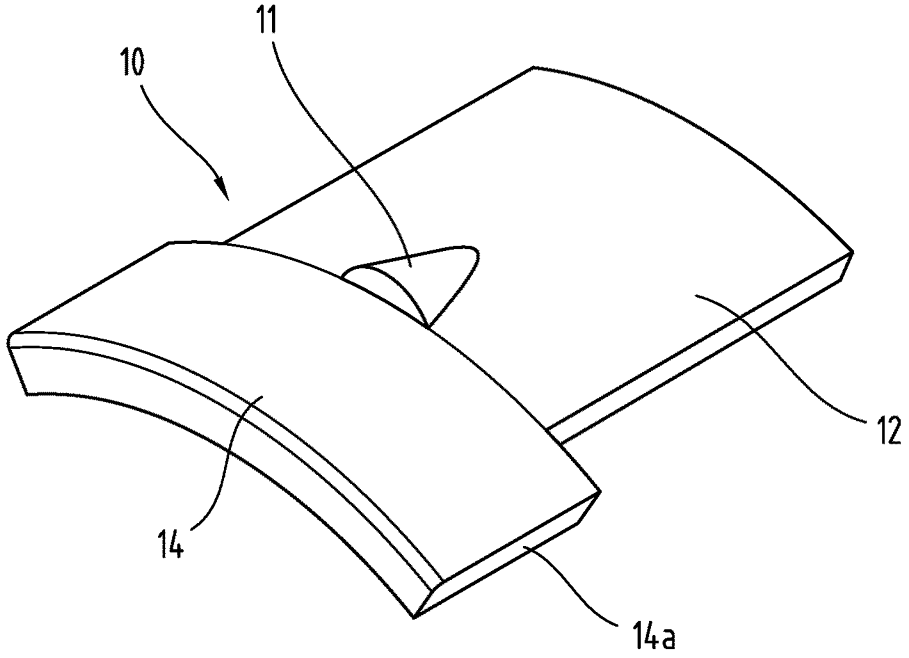
FIG. 3 shows a view corresponding to FIG. 2 of the limiting element of the connector assembly of FIG. 1.

In order to bridge the intermediate space between the end sections 7*a* of the edge 7 or ridge and thus protect the housing 1 against the ingress of dust, dirt or moisture, at least when the complementary connector is inserted, a limiting element 10 is provided—as shown in FIG. 2—which can be inserted into the recess 8 or a guide structure of this recess 8. Preferably, a first locking structure, for example designed as a lug 11 rising in the opposite direction to the insertion direction, is arranged on a side facing away from the insertion opening 3 in order to securely fix the limiting element 10, which is designed here as an insertion part and can be inserted into the recess 8—which is shown in detail in FIG. 3. Another possible variant of a first locking structure would be, for example, a tab bent upwards, punched out or cut out against the insertion direction. The first locking structure 11 is preferably positioned at the front end of the circumferentially narrower housing-side section 12. A complementary second locking structure is formed on the inside of the housing 1 in the region of the recess 8, which cooperates with the first locking structure 11 to fix the limiting element 10 in the housing 1. For example, the second locking structure can be designed as an undercut 13, behind which the front end of the lug 11 snaps in when the limiting element 10 is pushed in, thus securing it against falling out.

Advantageously, the limiting element 10 is designed as a flat part curved according to the course of the edge 7 or ridge. The above-mentioned housing-side section 12 of the limiting element 10 with its smaller width in the circumferential direction is adjoined by a somewhat wider, insertion-side section 14 of the limiting element 10. This section has a dimension which corresponds at least to the height of the ridge around the insertion opening 3. The width in the circumferential direction of the section 14 advantageously corresponds to the width of the cut-out of the edge 7 or ridge between the end sections 7*a* facing each other, so that preferably the side surfaces 14*a* of the section 14 abut as closely as possible against the end sections 7*a*. Since the recess 8 in the housing 1 is typically designed to accommodate a conventional locking assembly, the limiting element 10, in particular its housing-side section 12, is advantageously designed in such a way that it can be inserted into corresponding guides or receiving structures of these locking assemblies and, if necessary, can also be fixed in a detachable manner.

Figure 6:
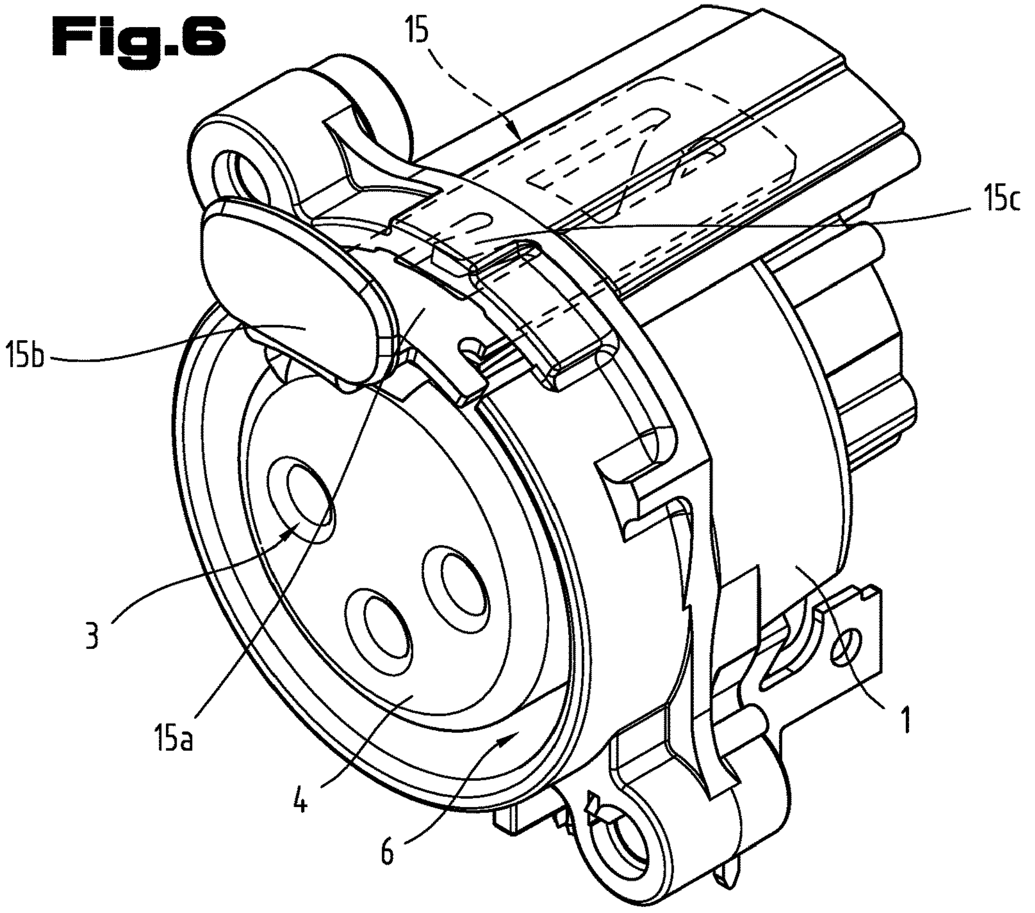
FIG. 6 shows a perspective view of a housing of a further embodiment of a connector assembly according to the invention, with locking assembly.
Figure 7:
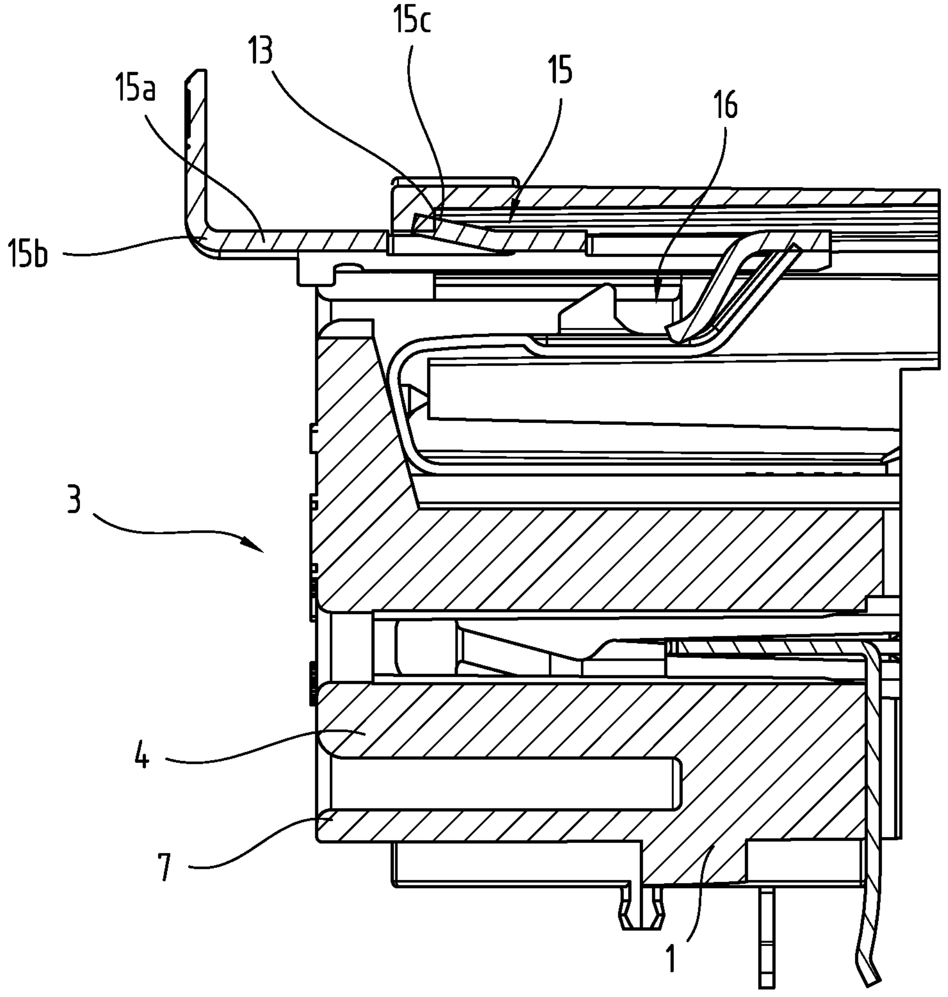
FIG. 7 shows a vertical, central longitudinal section through the connector assembly of FIG. 6.

One particular embodiment of the invention provides for housings with a locking mechanism, as exemplified in FIGS. 6 and 7, to use one of its elements as a limiting element. Particularly preferred for this purpose is the unlocking element 15. Typically, a locking assembly 16 inserted into the recess 8 in many types of housing has an unlocking element 15 extending or rising beyond the insertion-side end face. According to the invention, the side thereof facing the insertion opening 3 can form a partial region of the boundary of the insertion opening 3 and thus also represent the limiting element of this embodiment. Preferably, the unlocking element has a first section 15*a* extending coaxially with respect to the insertion opening 3 and preferably displaceable in its longitudinal direction, as well as a second section 15*b* at the insertion-side end, which is bent up radially from the axis of the first section 15*a* in the direction facing away from the insertion opening 3. Another possibility would be, for example, a lug 11 rising in the opposite direction to the insertion direction on the outside of the unlocking element 15. The locking structure 15*c* is again preferably positioned at the front end of the unlocking element, wherein it again preferably cooperates with a complementary second locking structure on the housing 1, for example again an undercut 13.

The exemplary embodiments show possible embodiment variants, wherein it should be noted at this point that the invention is not limited to the specifically depicted embodiment variants thereof, but rather also various combinations of the individual embodiment variants with each other are possible and this variation possibility due to the teaching for technical action by the present invention lies in the expertise of the person skilled in this technical field.

For the sake of good order, it should finally be pointed out that for a better understanding of the structure, elements have been shown partly unscaled and/or enlarged and/or reduced.

LIST OF REFERENCE SIGNS

1 Housing
2 Mounting tab

3 Insertion opening
4 Contact carrier
4*a* Openings
5 Contact
6 Annular gap
7 Edge
7*a* End section
8 Recess
9 Spring element
10 Limiting element
11 Lug
12 Housing side section
13 Undercut
14 Insertion-side section
15 Unlocking element
15*a* Housing-side section
15*b* Bent-up section
15*c* Tab
16 Locking assembly

The invention claimed is:

1. A connector assembly for electrical connectors, the connector assembly comprising:

a housing with electrical contacts located therein and an insertion opening for a complementary connector;

the insertion opening is bounded on an insertion side at least primarily by an edge section or a ridge rising above an insertion-side end face, and has a circumferentially limited recess in a region of the outer edge of the insertion opening, the recess also comprises an intermediate space between two mutually facing sections of the edge or ridge;

a limiting element bridges the intermediate space of the edge or ridge in a region of the circumferentially limited recess in the region of the outer edge of the insertion opening at least partially as a continuation thereof and, on a side facing the insertion opening, forms a partial region of the boundary of the insertion opening;

a first locking structure formed on a side of the limiting element facing away from the insertion opening or on a housing-side end thereof; and a complementary second locking structure formed on an inside of the recess, the second locking structure cooperates with the first locking structure to fix the limiting element in the housing.

2. The connector assembly according to claim 1, further comprising a locking assembly for the inserted complementary connector accommodated in the recess, and the limiting element is a part of this locking assembly.

3. The connector assembly according to claim 2, wherein the locking assembly comprises an unlocking element which extends or rises beyond the insertion-side end face and has a side facing the insertion opening that forms a partial region of the boundary of the insertion opening and which thus constitutes the limiting element.

4. The connector assembly according to claim 3, wherein the unlocking element has a first section extending coaxially with the insertion opening, and a second section at an insertion-side end, which is bent up radially from an axis of the first section in a direction facing away from the insertion opening.

5. The connector assembly according to claim 1, wherein the limiting element comprises a slide-in part insertable into the recess.

6. The connector assembly according to claim 1, wherein the limiting element comprises a flat part curved according to a course of the edge or ridge.

7. The connector assembly according to claim 5, wherein a housing-side section of the limiting element has a smaller width in the circumferential direction than an insertion-side section of the limiting element.

8. The connector assembly according to claim 5, wherein the recess in the housing is configured to accommodate a conventional locking assembly, and the limiting element is configured with a housing-side section thereof to match.

9. The connector assembly according to claim 1, wherein the first locking structure formed on the side of the limiting element extends outwardly from the limiting element.

* * * * *